E. T. BUSSELL.
Steam-Plow.
No. 20,605.
Patented June 15, 1858.
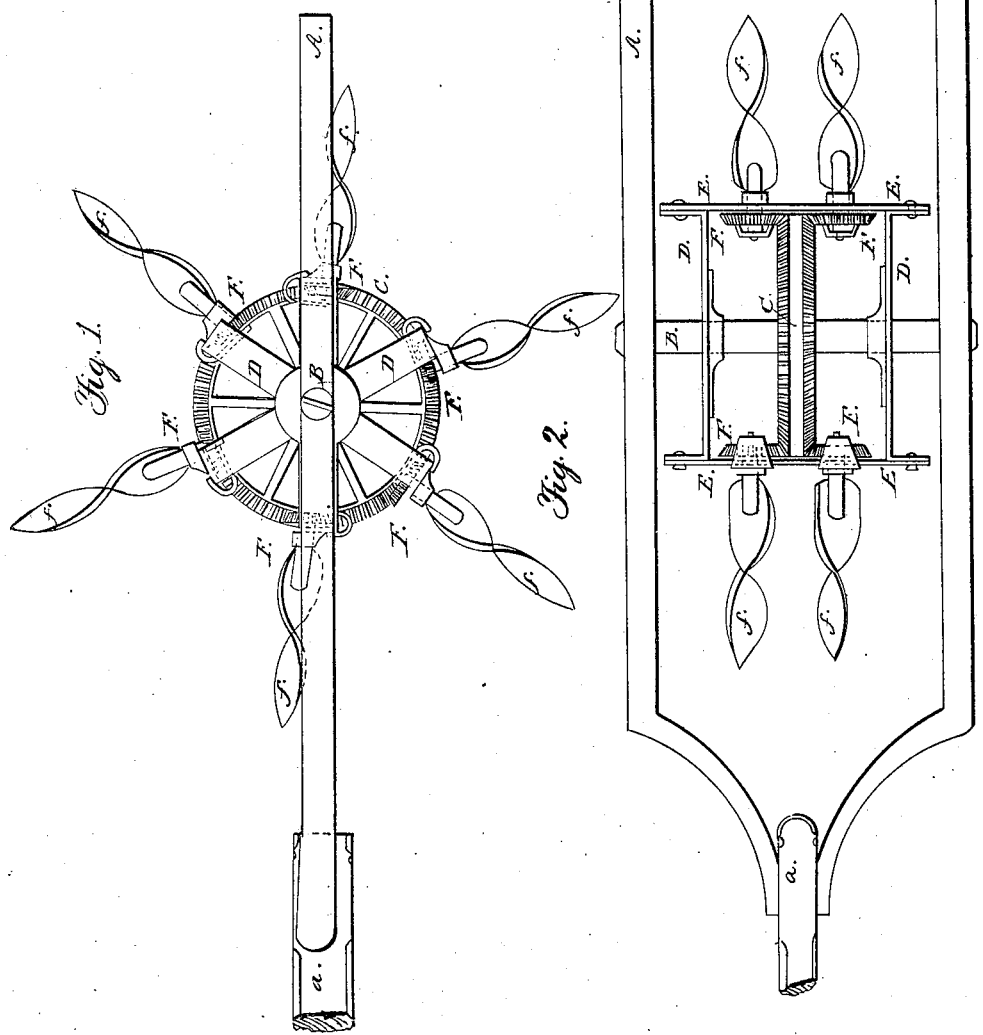

UNITED STATES PATENT OFFICE.

E. T. BUSSELL, OF SHELBYVILLE, INDIANA, ASSIGNOR TO WOMBAUGH BROTHERS & CO., OF CINCINNATI, OHIO.

IMPROVEMENT IN ROTARY CULTIVATORS.

Specification forming part of Letters Patent No. 20,605, dated June 15, 1858.

*To all whom it may concern:*

Be it known that I, ERASTUS TOUCY BUSSELL, of Shelbyville, in the county of Shelby and State of Indiana, have invented a new and useful Machine for Breaking up and Disintegrating the Soil for Purposes of Agriculture; and I do hereby declare that the following is a full and exact description thereof, reference being had to the accompanying drawings, and to the letters of reference marked thereon, like letters referring to like parts.

The nature of my invention consists in providing a hollow revolving drum, out of the surface of which projects any desired number of spiral, twisted, or otherwise shaped cutters arranged at suitable distances from each other, to each of which a rotary motion is communicated, as said hollow drum revolves upon its axis, by means of fixed cogged master-wheels within the drum, into which small cog-wheels play as they are carried around by the drum. The effect of this is to present to the earth a constantly varying point of traction, thereby giving the force applied every conceivable advantage in the breaking up and disintegrating the soil.

To enable others who are skilled in the manufacture of this class of implements to make one of these plows, I shall proceed to describe it, desiring at the same time that the accompanying drawings shall constitute a portion of said description.

Figure 1 is a side elevation. Fig. 2 is a top view.

In the first place, I provide one or more double-beveled-cog wheels, C, which are keyed fast to shaft B. This shaft is provided with square shoulders at the ends, in order that it may be held firmly in the outside frame-work, A, and kept from revolving. Then take any desired number—twelve, or more—of small pinions, F F F, to each of which is attached the twisted or otherwise shaped blades $fff$. Arrange these at equal distances from each other in suitable bearings in the frame-work E E E. The inner ends of these pinion-shafts may be held by brackets, as shown in the drawings; or they may continue to the center shaft, B, where they may be held by loosely-fitting collars, which can revolve around said shaft or axle B. This arrangement is not to be seen in the drawings, but nevertheless I contemplate using it in making very large machines. I further contemplate using spiral or other kind of springs on each of these pinion-shafts, so as to allow each cutting-blade $ff$ to yield any given number of inches, which is a guard against violence from stones, roots, or other obstructions.

For ordinary purposes the device as here shown embodies all the essential features.

The end pieces, D D, serve to hold the pieces E E E together, and also afford in their center a bearing for the same to revolve upon the shaft B. In all cases the spaces between E E should be closed up with sheet-iron, or with wooden boards, which will prevent the ingress of dirt to the cogged machinery within. The tongue of this machine is represented at $a$.

For graduating the depth that this plow shall work a broad-tread wheel in front, or one on each side, may be used, so arranged in a movable frame-work that they can be elevated or depressed at pleasure, and so determine the depth of the plow.

The function of this plow is as useful as its mode of operation is simple. In the former it will break up and thoroughly pulverize the earth to a greater depth with a given force than any other device known, and at the same time it will mix the sub and the surface soils most completely. The advantages arising from this treatment of the soil are self-evident, and its operation is so simple and so plain that it needs no explanation.

In making these plows for the various purposes for which they will be used, as well as their adaptation to the varied soils in the country, many modifications will be necessary, some of which are hinted at above. It will be distinctly understood, therefore, that I do not confine myself to any particular style so long as I maintain substantially the features herein set forth.

What I claim therefore, and desire to secure by Letters Patent, is—

The arrangement of machinery, substantially as herein set forth, for breaking up and disintegrating the earth for purposes of agriculture.

ERASTUS T. BUSSELL.

Attest:
JOHN KEESHAN,
JOHN M. FOSS.